US010796364B2

(12) United States Patent
Hansen et al.

(10) Patent No.: US 10,796,364 B2
(45) Date of Patent: Oct. 6, 2020

(54) PROCESS FOR PROVIDING TIMELY QUALITY INDICATION OF MARKET TRADES

(75) Inventors: Peter Hansen, Stamford, CT (US); Nicolay Landmark, Hail Green (GB); Lars Kragh, Stamford, CT (US)

(73) Assignee: NYSE Group, Inc., New York, NY (US)

( * ) Notice: Subject to any disclaimer, the term of this patent is extended or adjusted under 35 U.S.C. 154(b) by 472 days.

(21) Appl. No.: 10/825,726

(22) Filed: Apr. 15, 2004

(65) Prior Publication Data

US 2005/0234799 A1    Oct. 20, 2005

(51) Int. Cl.
*G06Q 40/00* (2012.01)
*G06Q 40/04* (2012.01)

(52) U.S. Cl.
CPC .................... *G06Q 40/04* (2013.01)

(58) Field of Classification Search
CPC .... G06Q 40/06; G06F 9/451; G06F 2209/501
USPC ............................................. 705/35, 36, 37
See application file for complete search history.

(56) References Cited

U.S. PATENT DOCUMENTS

| 5,161,103 | A | 11/1992 | Kosaka et al. | |
|---|---|---|---|---|
| 5,339,392 | A | 8/1994 | Risberg et al. | |
| 6,453,303 | B1 | 9/2002 | Li | |
| 7,110,969 | B1 * | 9/2006 | Bennett et al. | 705/35 |
| 2002/0013176 | A1 | 1/2002 | Yoshimi et al. | |
| 2002/0016756 | A1 * | 2/2002 | Rinaldi | G06Q 20/108 705/36 R |
| 2002/0099646 | A1 * | 7/2002 | Agarwal et al. | 705/37 |
| 2003/0050879 | A1 * | 3/2003 | Rosen et al. | 705/35 |
| 2003/0163404 | A1 | 8/2003 | Hu et al. | |
| 2003/0163469 | A1 * | 8/2003 | Garth | G06F 16/20 |
| 2003/0177085 | A1 * | 9/2003 | Buckwalter et al. | 705/37 |
| 2003/0225660 | A1 * | 12/2003 | Noser et al. | 705/36 |

(Continued)

FOREIGN PATENT DOCUMENTS

| CN | 1153562 A | 7/1997 |
|---|---|---|
| CN | 1245574 A | 2/2000 |

(Continued)

OTHER PUBLICATIONS http://web.archive.org/web/20020603130901/www.tradewiser.com/brokers.shtml.*

(Continued)

*Primary Examiner* — Scott S Trotter
(74) *Attorney, Agent, or Firm* — DLA Piper LLP (US)

(57) ABSTRACT

Real time or near real time assessment of the quality of securities transactions is accomplished by intercepting order and execution communications between trader and broker, comparing the execution data with contemporaneous market data relative to the transaction or transactions involved, and informing the trader of that comparison. This is accomplished without interrupting or impeding the trader-broker communications, except that a broker-trader communication may, if desired, be interrupted and relevant data aggregated until the aggregate reaches a desired value. It is preferred that the comparison be between the volume-weighted average price of the securities transaction and the volume-weighted average price of the market data for that security, over the life of the order. A particular effective way to communicate the quality evaluation to the trader is disclosed.

24 Claims, 6 Drawing Sheets

(56) References Cited

U.S. PATENT DOCUMENTS

2004/0059628 A1\* 3/2004 Parker et al. .................. 705/12
2004/0243502 A1 12/2004 Slowik et al.

FOREIGN PATENT DOCUMENTS

| CN | 1359072 A | 7/2002 |
| CN | 1468410 A | 1/2004 |
| WO | 95/18418 | 7/1995 |
| WO | 03/105055 A1 | 12/2003 |

OTHER PUBLICATIONS

Non-Disclosure Agreement Between Two Companies, www.mbadesk.com/agreements, Dec. 4, 2003.\*
Quality of Execution, LLC., www.qualityofexecution.com, Jun. 20, 2003.\*
Unknown, Packet analyzer, Aug. 11, 2002, Wikipedia, Packet analyzer definition.\*
Unknown, Electronic mailing list, Jan. 23, 2003, Wikipedia.org, definition of Electronic mailing list.\*
Unknown, Blind carbon copy, Nov. 5, 2003, Wikipedia.org, definition of Blind carbon copy.\*
The Chinese Official Action dated Jun. 1, 2015 in corresponding Chinese Patent Application No. 201210295859.0 along with an English translation.
The Canadian Official Action dated Mar. 27, 2015 in corresponding Canadian Patent Application No. 2,578,655.
A Chinese Official Action dated Jan. 12, 2016 in corresponding Chinese Patent Application No. 200580015581.5 along with an English Summary.
A Chinese Official Action dated Jan. 19, 2016 in corresponding Chinese Patent Application No. 201210295859.0 along with an English Summary.
Brazilian Official Action dated Mar. 27, 2017 in corresponding Brazilian Patent Application No. PI05009937-4.
Canadian Office Action dated Aug. 14, 2017 in corresponding Canadian Patent Application No. 2,578,655.

\* cited by examiner

PROCESS FOR PROVIDING TIMELY QUALITY INDICATION OF MARKET TRADES

FIELD OF THE INTENTION

The present invention relates to electronic communication networks utilized for securities trading and more specifically to a system and method which allows for real time or near real time execution quality indications to financial market traders and others.

BACKGROUND OF THE INVENTION

Markets have existed for centuries which allow people to buy and sell securities (e.g., stocks, futures, options, commodities, etc.). Today, examples of these markets in the United States are: The New York Stock Exchange (NYSE), The National Association of Security Dealers Automated Quotation (NASDAQ) System, and The American Stock Exchange (AMEX). These modern security markets facilitate the exchange of over two billion shares of stock every business day.

Investors, either personally or through professional intermediaries (hereinafter generally designated "traders") typically place orders with brokers, who then execute the orders, typically through buying or selling financial instruments (stocks, investment instruments, options, bonds, etc.) in the open market. For large orders, the process by which the financial instruments are obtained is not trivial—the trader or broker has to manage the way the order impacts the market to avoid affecting the price, as well as generally securing the best possible price for the trader. The broker's performance in this regard is of interest to the trader. The trader will prefer to use a broker that gets better prices.

The need for "broker report cards" and "league tables" to determine which broker is best for a given financial instrument is well known, and several companies already provide such a service. For example, TAG provides a monthly report that shows this kind of information. The problem with the current state of the art is that the information is not available in real time. It would be a great benefit for a trader to be able to see how good a job the broker is doing on a particular order as it is actually being executed in the market. Accordingly, what is needed is a method for providing an indication of execution quality in real time, or near real time, so the trader will know immediately whether a particular order or series of orders is being handled well.

SUMMARY OF THE INVENTION

The present invention is a system to track the quality of order execution in real time, or near real time, so the investor will know immediately whether a particular order is being handled well. Additionally, statistics may be kept over a longer term, so broker performance over longer time periods than one day or one order can be monitored.

Executions are currently sent back electronically to the trader from the executing venue. The present invention introduces an intercept in the electronic data connection between the executing broker and the trader's order management system. This non-intrusive intercept records the orders and executions without interfering with the communications between the trader and the executing venue, and sends the information to an Execution Quality Calculation Module ("EQCM"). The EQCM furthermore has access to market data via an electronic link. The EQCM calculates the execution quality in real time (or near real time) and displays the results to the trader.

According to a preferred embodiment of the invention, the execution quality is calculated as the difference between the volume-weighted average price ("VWAP") of the trader's executions and the VWAP of the market data for that security, over the life of the order. This difference can be displayed as a number, or represented graphically. In particular, the invention can keep track of the execution quality for one or more orders, and indicate to the trader if the value is departing from certain limits. This warning can be visible or audible, or both. Furthermore, an indication of the order's price impact on the market may be given, by displaying to the trader the relative size of his own executed trades compared to the volume being traded in that security by other market participants.

DESCRIPTION OF THE PREFERRED EMBODIMENTS

An entity which wishes to buy or sell a security acts either personally or through some other entity (here generally termed a "trader") to execute the particular transaction involved. The trader buys or sells the direct financial instrument through the services of an executing broker. The process for handling the order requires experience and skill. The trader not only should secure the best price for himself or his client, the investor, as the case may be, but in so doing has to manage the way in which the particular order in question impacts the market, since that impact can affect the price paid. It is therefore of importance to the trader to work through a broker who performs best from the point of view of the trader and this, of course, significantly involves the skill of the broker who has been selected. Particularly with high trading activity it is important to be able to evaluate the performance of the broker that has been selected so that, the best broker can be selected for subsequent transactions.

Figure 1:
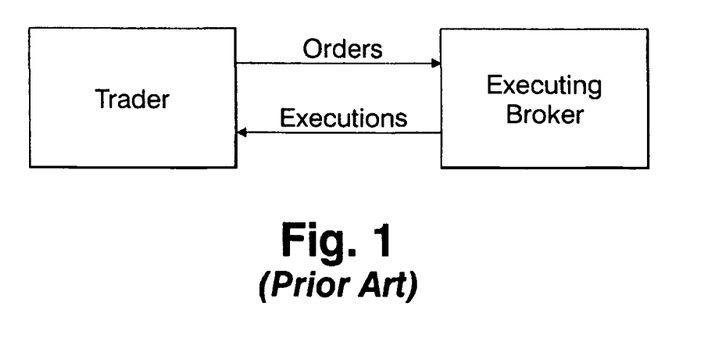
FIG. 1 is a diagram illustrating the normal communications between traders and brokers.

As indicated in FIG. 1, the normal security transaction involves an electronic order, typically using FIX from the trader to the executing broker to carry out a certain purchase or sale and, during or after the transaction, a communication from broker to trader of the details of the transaction. An order may be outstanding in the market for an extended period of time, even days, weeks or months, and the trade may ten get continuous updates as partial executions occur in the market. The present invention will enable the trader to maintain an overview of execution quality at all times, even before that order has been completely filled. The order information from trader to broker and the execution information from the executing venue to trader are ordinarily accomplished electronically over a suitable communications link in machine-readable form.

Figure 2:
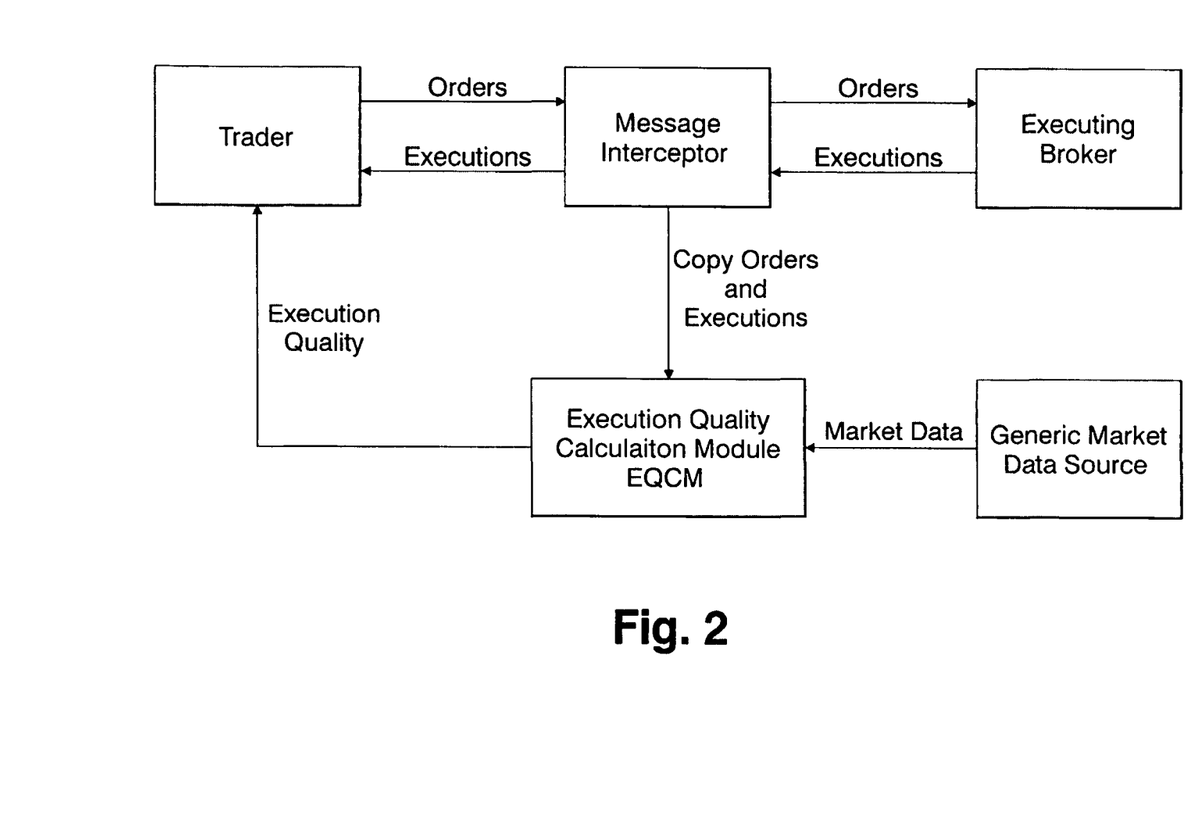
FIG. 2 is a diagrammatic representation of one aspect of the system of the present invention.

The entity in charge of the communication link between trader and broker is thus in a particularly strategic position to determine and convey to the ultimate investor or other trader whether the executing broker is performing optimally, or to convey to the ultimate investor or other trader whether the executing broker is performing optimally, because the communication entity has real time access to the trader/broker and market communications. Consequently, in accordance with the present invention, and as indicated in FIG. 2, when evaluation of a particular order or orders is desired the relevant order communication is sensed by a message interceptor and the identity of the order or orders to be evaluated is sent to an EQCM where that information is stored. As the order is being processed the executing venue sends execution information back to the trader over an appropriate accessible communications link. The message interceptor will intercept relevant execution information identified by the previously stored order information (a single order will often involve a plurality of executions), and will send that execution information to the EQCM. That module will also receive up-to-date market data relative to the transaction in question on a real time basis and will compare that relevant market data with the execution data. It will then convey that comparison, which is a measure of the quality of the particular execution in question, to the entity ("trader") seeking that information. The interception of order data and in most cases of execution data is carried out without restricting the transmission of the data between trader and or market broker; the relevant data is merely accessed and sent to the calculating module. That module may be connected to a generic market data source which maintains up to date data on the current prices of the securities in question, the calculation module obtaining data from that source with respect to the particular security then being evaluated.

It is preferred to calculate the execution quality of a particular transaction or transactions by the difference between the volume-weighted average price of the executions in question and the volume-weighted average price (VWAP) of the market data for that security over the life of the order. Alternatively, the comparison can be with the last execution price before the order was entered, or with the average (possibly VWAP) execution price for some time before the order was entered. The difference can be displayed in any appropriate manner, as by number or by a graphical representation. In particular, the process can keep track of the execution quality for one or more orders from a given trader and indicate to the trader if the value is departing from certain limits. This warning can be visible, audible, or both.

Preferably also, the system can indicate a given order's volume impact on the market by displaying to the trader the relative size of his own executions compared to the volume being traded in the security by other market participants.

Figure 3:
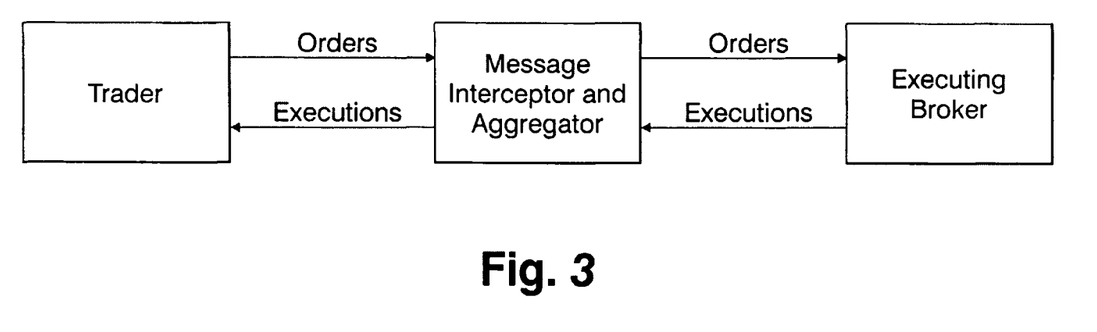
FIG. 3 is a diagrammatic representation of an additional optional feature in the process of the present invention.

While one of the main advantages of the system of the present invention is that it functions from the trader-client transmission in real-time without interfering with that transmission, there is one set of circumstances where the processing of the present invention can, if desired, be designed to interfere with the transmission of execution information from broker to trader but without impeding the real time evaluation of transaction quality. Currently an executing venue or broker can "bunch up" executions before transmitting them to the trader in larger lots (e.g., 5 executions of 100 shares each might be sent as one execution of 500 at the average price of the five). This is a service that the broker has traditionally provided as a convenience to the trader—sparing the trader from having to deal with large numbers of small executions. Also, some order management systems are known to suffer performance degradation when presented with a large flow of small executions. The major disadvantage of executing broker "bunching" is that with such "bunching" the trader cannot track execution quality in real-time unless all the executions are transmitted at or near the time they actually happen in the market. Hence, if desired, and as is illustrated in FIG. 3, the executing broker may still send execution data to the trader immediately as the relevant transactions occur, permitting the system to perform real time execution quality calculations, but in this embodiment the interceptor itself can act as a "bunching" agent, aggregating executions and transmitting them to the trader only in larger lots, the size of the lot being determined by the trader. With this bunching of the multiple small executions into a smaller number of larger executions an average price for the transactions can be computed by the system and transmitted to the trader and, if desired, used as the evaluation criterion.

While the quality evaluation can be communicated to the trader in a wide variety of arrays, a particularly effective and helpful (to the trader) way is by means of computer assisted displays. We have invented a display protocol disclosed in FIGS. 4-7 which in general and in detail is very valuable.

Figure 4:
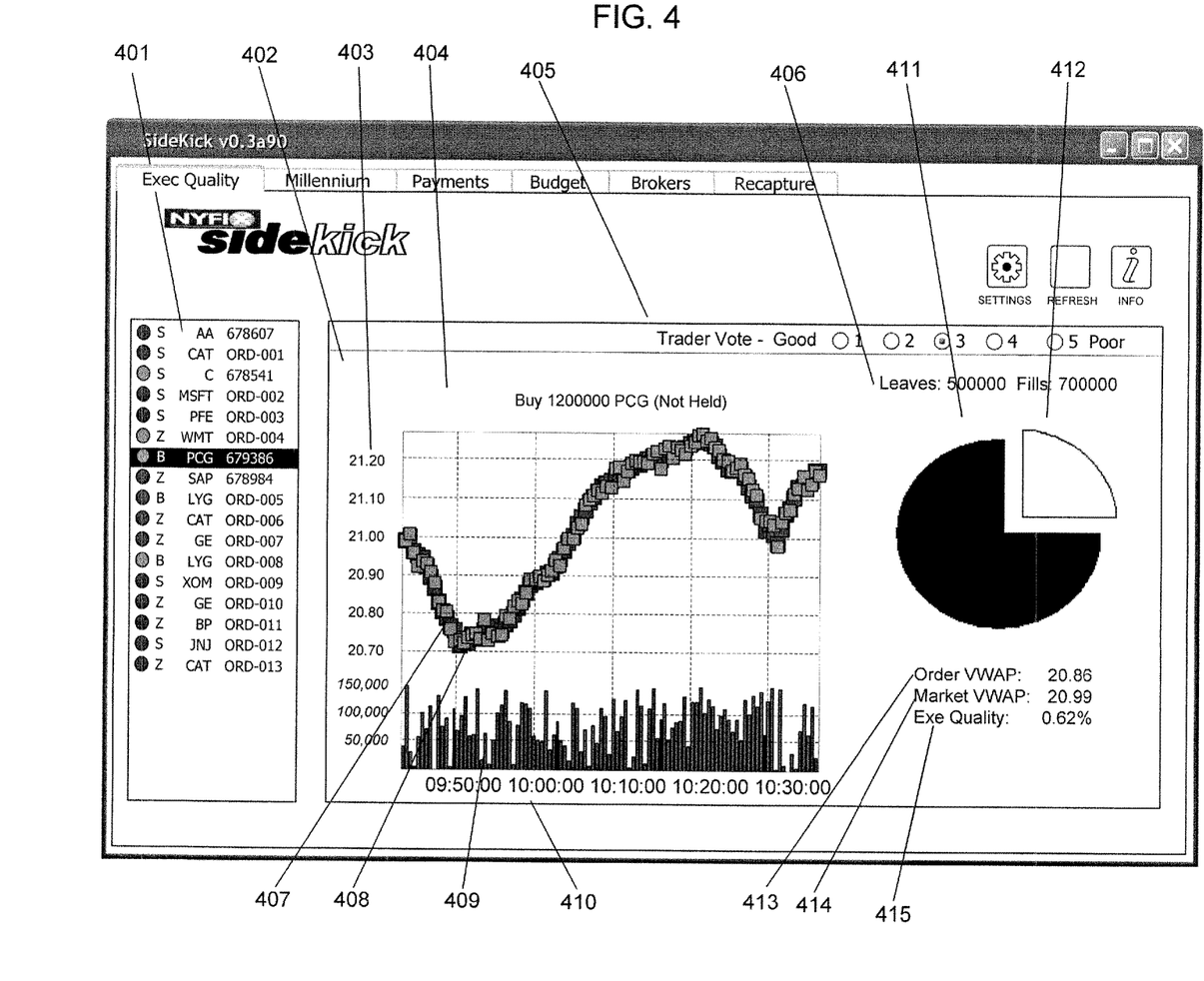
FIG. 4 is a screen through which the system displays real time (or near real time) execution quality as related to currently open orders.

In FIG. 4 the computer system presents a trader with means to view the execution quality. The trader selects an order from the list 401 as an input field for identifying the order to be analyzed in the display panel 402. The row of bulbs at the left of the list 401 display colors which indicate the execution quality of the order in question. The point graph displays market execution data for the selected order's stock symbol as green points 407, while executions by others in that stock symbols are overlaid using red points 408. The volume for each transaction is indicated with bars 409. The abscissa axis is the time of day 410, while the ordinates 403 are volume for the lower graph, prices for the upper.

A label 404 indicates whether the selected order was buy, sell or sell short—as well as the order quantity, stock symbol, and special handling instructions e.g. Not Held.

To the right of the screen a pie chart indicates what proportion of the market volume was executed for the selected order 412, and what proportion was executed by the rest of the market 411.

Under the pie chart, an average price is indicated for the selected order 413, for the rest of the market 414. The execution quality is indicated by the label 415.

Means for entering a trader vote is provided by a row of buttons 405. Once the trader has selected one of the values, the opportunity to make a written comment to the selected order is provided (not shown).

Figure 5:
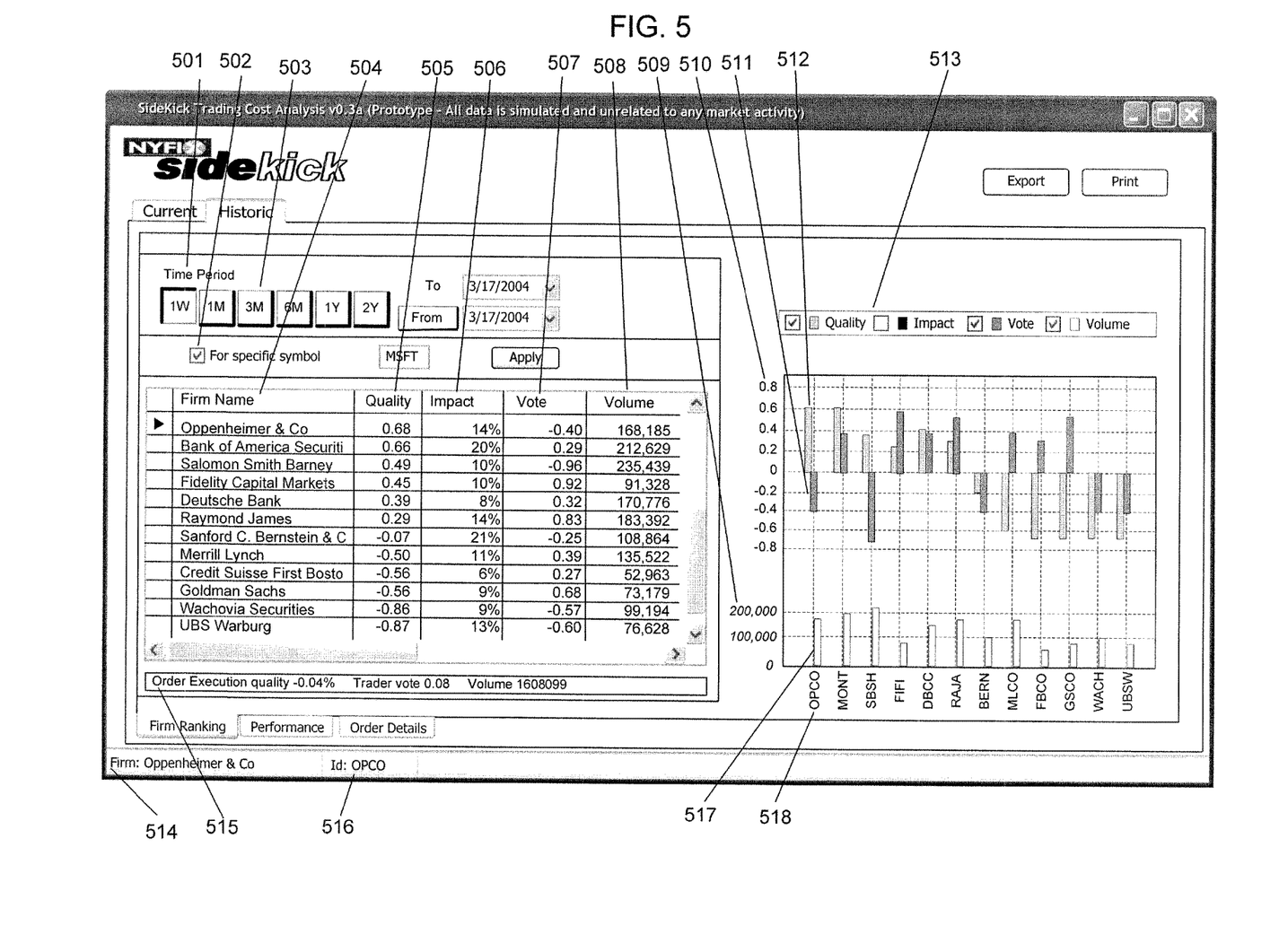
FIG. 5 is a screen through which the system displays historic relative performance ranking of executing brokers, the performance benchmarks being execution quality, volume impact, trader vote, and total volume.

Turning to FIG. 5, the purpose of the screen is to rank the executing venues (brokers) according to the performance benchmarks execution quality, volume impact, trader vote, and total volume. A panel 501 provides means for selecting a time period for analysis, with means for quickly setting standard time periods 503. The results are shown in a table with columns Firm Name 504, Quality 505 (execution quality), Impact 506 (percentage of market volume captured), Vote 507 (trader vote), Volume 508 (total volume traded). The figures in these columns are summaries, over the selected time period. By clicking on one of the column headings, the table will be sorted, normally in descending order, by the values in that column. Optionally, the information in the table can be made to pertain to one single symbol, by means of providing an input in panel 502.

The data in the table is also displayed graphically on the right of FIG. 5, where the legend 513 also acts as means to select which data the user wishes to display on the graph (in this example, "Quality", "Vote", and "Volume"" have been selected for display). The abscissas 518 for all data are firm mnemonics that identify each broker. The total volume is shown as a bar graph 517 with ordinates 509. The trader vote and execution quality are shown as bar graphs 511 and 512 respectively, with ordinates 510.

At the bottom of the screen, the currently selected firm is indicated in the panel 514. The firm's identifying mnemonic is indicated in panel 516.

Figure 6:
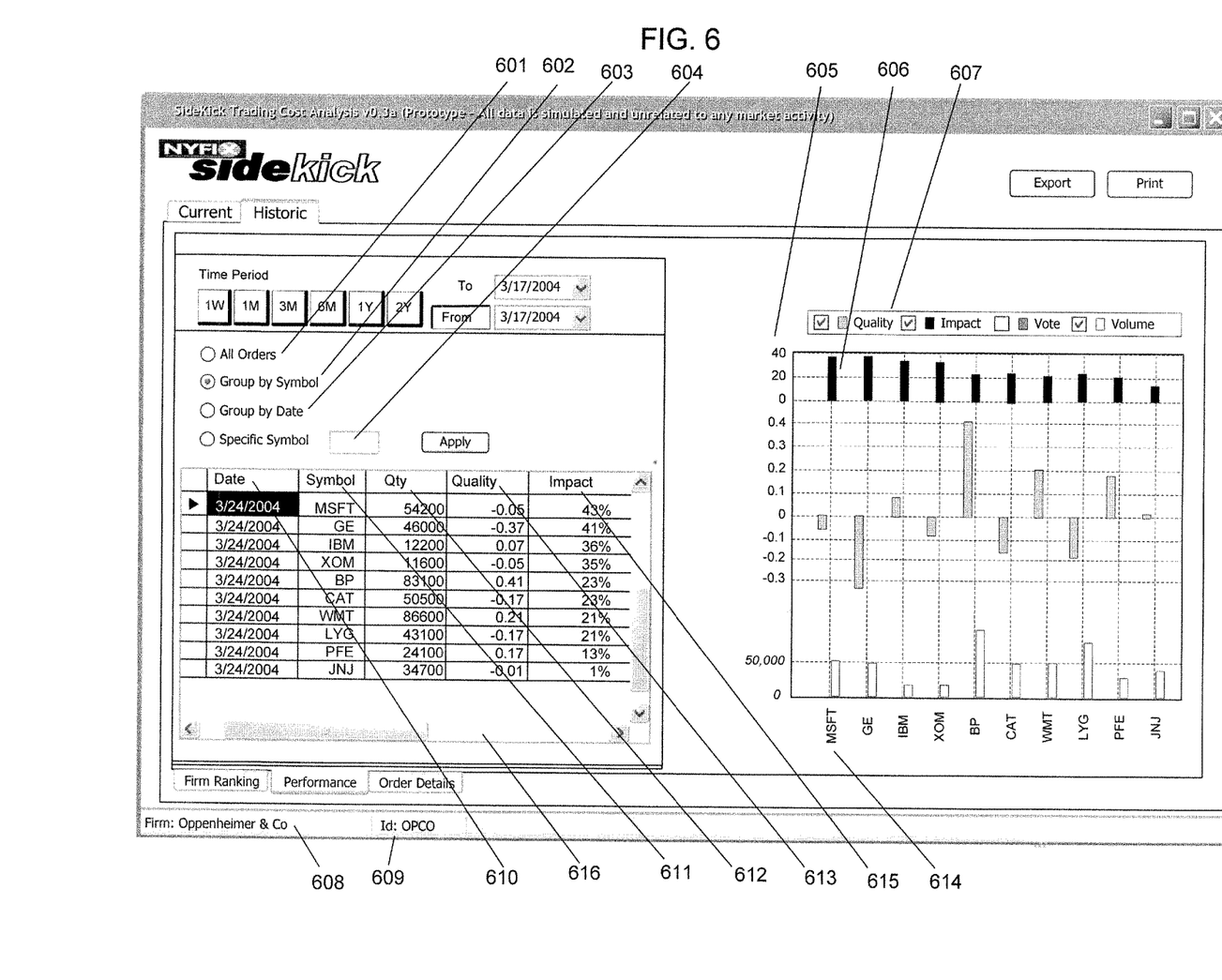
FIG. 6 is a screen through which the system displays the historic performance of one particular broker, the performance benchmarks being execution quality, volume impact, trader vote, and total volume.

The screen in FIG. 6 displays similar information to FIG. 5, with the primary difference being that the information applies to the selected firm only (indicated in panels 608 and 609). The orders for the selected firm for the selected time period are listed in the table with headings "Date" 610 (order date), "Symbol" 611 (stock ticker symbol), "Qty" 611 (order qty), "Impact" 615 (proportion of market volume acquired for this order while it was open). Column headed "Vote" (Trader Vote) is not shown, but can be made visible by means of a horizontal scroll bar 616. The table can be sorted as with the screen of FIG. 5 by clicking on the table headings. Also shown in FIG. 6 is the "Impact" bar graph 606, which is visible due to being selected in the panel 607. The abscissae on this graph are the stock ticker symbols 614. The ordinates for the "impact" bar graph are at the top left of the chart 605.

Figure 7:
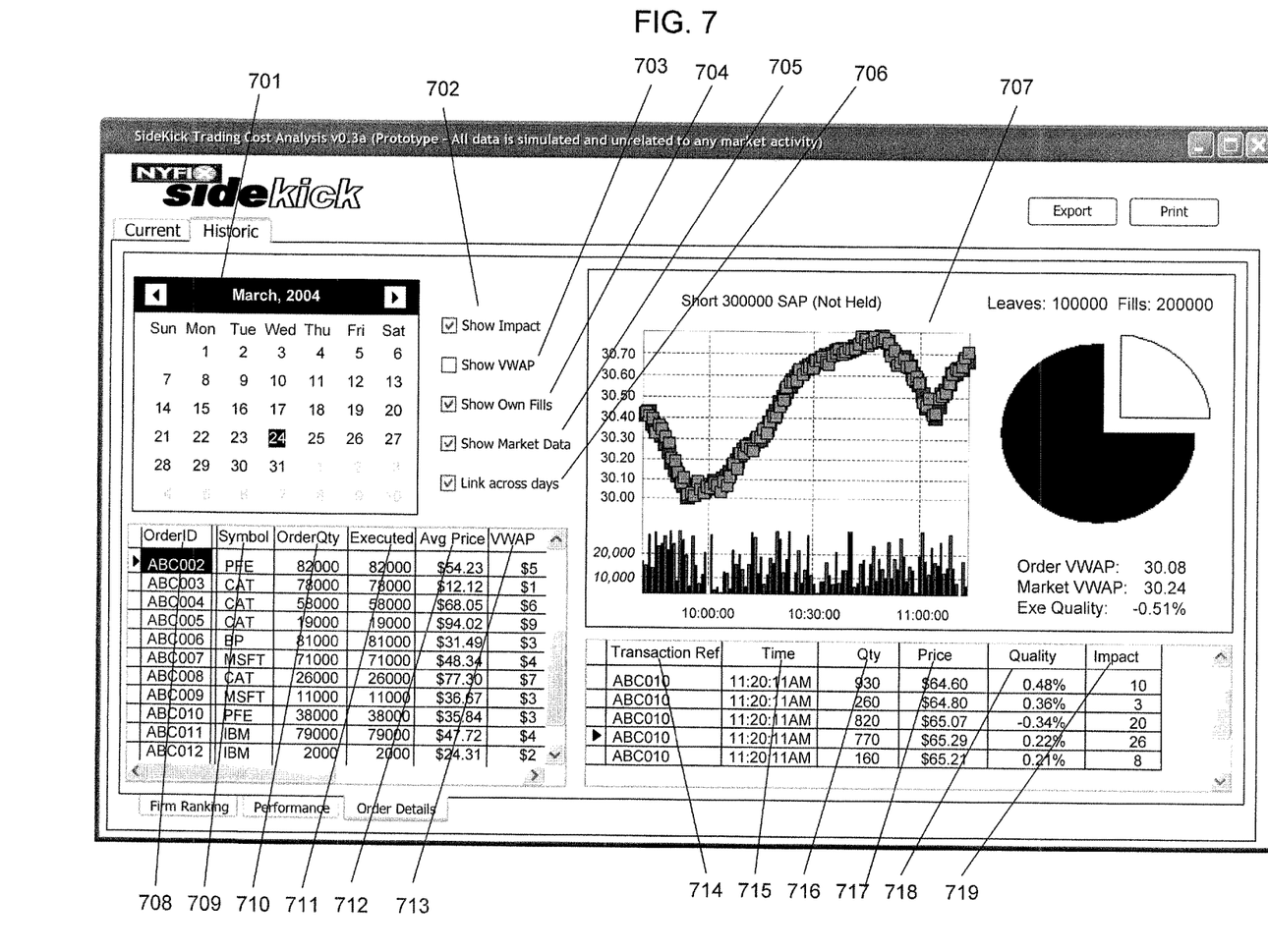
FIG. 7 is a screen through which the system displays historic details and market data pertaining to a particular order, as well as performance benchmarks execution quality, volume impact, trader vote, and total volume.

Turning to FIG. 7, the screen displays detailed information about all orders for the selected firm on selected dates. The dates are selected by clicking in the calendar 701. The orders are shown in the table below the calendar, with headings "Order ID" 708 (Order identifier), "Symbol" 709 (stock ticker symbol), "OrderQty" 710 (order quantity), "Executed" 711 (actually executed quantity), "Avg Price" 712 (Order average price), "VWAP" 713 (Order volume weighted average price). A specific order is selected by clicking on it in this table. By means of a number of check boxes, the graph 707 (which is similar to FIG. 4) can be made to display various information. The control marked "Show Impact Pie" 702 enables or disables the display of the pie chart. The control marked "Show VWAP" 703 enables/disables displaying the VWAP price as a line on the price graph. The control marked "Show Own Fills" 704 enables and disables the display of own orders' executions on the price graph. The control marked "Show Market Data" 705 enables and disables the display of market data not belonging to the selected order. The control marked "Link across days" 706 prompts the system to display several days' worth of data, for orders that remained open more than one trading day. Details of the executions against the selected order are displayed in the table below the graph with heading "Transaction Ref" 714 (Transaction identification), "Time" 715 (date/time of the execution), "Qty" 716 (Execution quantity), "Price" 717 (Execution price), "Quality" 718 (Execution quality), and "Impact" 719 (Percentage market share for this order)

While only a limited number of embodiments in the present invention have been specifically described above it will be apparent that many variations may be made therein, all without departing from the spirit of the invention as described in the following claims.

We claim:

1. A method for determining and conveying a quality associated with data transmissions in real time without interfering with the data transmissions, comprising:
   providing a system comprising a message interceptor module, an execution quality calculation module and a graphical user interface (GUI), the system in electronic communication with a securities investor system and an executing broker system;
   non-intrusively copying, at the message interceptor module, transmission data defining a desired open securities order communication associated with an open securities order from the securities investor system to the executing broker system;
   deriving, by the message interceptor module, order information from the desired open securities order communication;
   selectively copying, at the message interceptor module, one or more transmissions comprising data defining open securities order execution communications from the executing broker system to the securities investor system;
   deriving, by the message interceptor module, execution information from each of the copied one or more transmissions of the open securities order execution communications that are associated with the order information derived from the copied open securities order communication;
   calculating, by the execution quality calculation module, one or more execution qualities based on the execution information;
   generating, by the GUI, on at least one display device of the securities investor system, a first screen, the first screen comprising a selectable first region configured to display the one or more execution qualities in real-time in a graphical format simultaneously with the order information;
   generating, by the GUI, on the first screen, a second region and at least one input area, responsive to a selection of the selectable first region, the second region configured to display execution quality information and the execution information during execution of the open securities order;
   receiving, via the at least one input area of the GUI, input from the at least one display device comprising a user performance metric;
   aggregating, by the execution quality calculation module, the received input with other input, received via the GUI, associated with the open securities order to form an aggregated user performance metric; and
   generating, by the GUI on at least one second screen, the aggregated user performance metric as part of performance benchmark information associated with the executing broker system.

2. The method of claim 1, wherein said execution quality information comprises an indication of deviation of a value describing at least one of said one or more execution qualities from one or more predetermined limits.

3. The method of claim 1, further comprising graphically displaying, via the at least one display device of the securities investor system, said one or more execution qualities in a comparative format comprising color coding.

4. The method of claim 1, wherein said execution quality information comprises a comparison of execution qualities for a plurality of pending securities orders having order identities relevant to a plurality of previously stored securities order information derived from the copied transmission data of the desired open securities order communication.

5. The method of claim 1, wherein said performance benchmark information comprises a comparison of a performance of two or more selected executing brokers using said one or more execution qualities for said copied open securities order execution communications such that a best broker out of said two or more selected executing brokers is further identified, said two or more selected executing brokers being associated with one or more executing broker systems.

6. The method of claim 1, wherein said execution quality information comprises a proportion of a market volume executed for said copied open securities order execution communications compared to a volume being traded for a security of said copied open securities order execution communications by other market participants.

7. The method of claim 1, further comprising:
impeding transmission of at least one of the open securities order execution communications to the securities investor system for a period of time;
aggregating at least one order execution, from the one or more order execution communications, to a predetermined size of transaction during said impedance, wherein said calculating of the one or more execution qualities and generating in real-time the one or more execution qualities to the securities investor system is not impeded; and
conveying said aggregate of order executions to said securities investor system at the expiration of said period of time.

8. The method of claim 1, wherein information displayed via the GUI regarding said one or more execution qualities is accumulated over a predetermined period of time.

9. The method of claim 1, wherein information regarding the one or more execution qualities is graphically displayed on one or more of the first screen and the at least one second screen, said graphically displayed information comprising one or more of the following:
a comparison of execution qualities for a plurality of open securities orders sent to said executing broker system, or sent to more than one executing broker system,
an identification of a securities order for a plurality of selected securities orders for the executing broker system,
a visual identification of a plurality of execution qualities comprising all or a selected one or more execution qualities which have been previously or currently provided for the plurality of selected securities orders,
a list of a plurality of executing brokers arranged in an order corresponding to a performance quality,
a selection for related information to a particular securities order of said plurality of selected securities orders,
an indication of what proportion of said particular securities order has been executed, and
a selection for recording by the securities investor system an opinion about implementation of said particular securities order, or about the performance of one or more executing brokers associated with the executing broker system.

10. The method of claim 1, wherein calculating the one or more execution qualities further comprises:

receiving in real-time, by the execution quality calculation module, the execution information from the message interceptor module, and real-time generic market data related to the open securities order; and
comparing, by the execution quality calculation module, the corresponding generic market data with the execution information of each of the open securities order execution communications to calculate, in real-time, the one or more execution qualities, said one or more execution qualities being indicative of an executing broker performance.

11. The method of claim 10, wherein at least one of said one or more execution qualities is assessed by calculation of a difference between a volume-weighted average price indicated within said copied open securities order execution communications, and a volume-weighted average price of said real-time generic market data or near real-time market data.

12. The method of claim 1, wherein:
said non-intrusively copying comprises copying of at least one two-way data transmission without interfering with a transmission path or time of the at least one two-way transmission, comprising:
copying, at the message interceptor module, a transmission comprising the transmission data from an electronic communication link between the securities investor system and the executing broker system where the executing broker system is a destination of the transmission,
the copying occurring in real time as the transmission is traveling between the securities investor system and the executing broker system over the electronic communication link without interfering with the transmission path or time from the securities investor system to the executing broker,
sensing, by the message interceptor module, the desired open securities order communication within the transmission from the copied transmission, and
receiving and storing, at the execution quality calculation module, from the message interceptor module, the order information derived from the copied transmission of the desired open securities order communication,
the selectively copying of the one or more transmissions further comprises copying the one or more transmissions from the electronic communication link with the securities investor system as a destination of the one or more transmissions, the copying occurring in real time as the one or more transmissions are traveling between the securities investor system and the executing broker system over the electronic communication link without interfering with a transmission path or time of the one or more transmissions from the executing broker system to the securities investor system,
sensing, by the message interceptor module, the open securities order execution communications within the one or more transmissions from the copied one or more transmissions,
matching, by the message interceptor module, the sensed open securities order execution communications with the order information derived from the copied open securities order communication,
deriving, by the message interceptor module, the execution information responsive to the matching, transmitting, by the message interceptor module to the execution quality calculation module, the execution information, responsive to deriving the execution information, and wherein the one or more execution qualities are conveyed by the GUI on the at least one display device over an independent electronic communication link between the execution quality calculation module and the securities investor system.

13. A special-purpose computer system, operatively connected to an electronic communication network and configured to determine and convey a quality associated with data transmissions in real time without interfering with the data transmissions, comprising:

a storage;

a graphical user interface (GUI);

a message intercept processor interposed on an electronic communication link of said network between a securities investor system and an executing broker system and operatively connected to said storage; and an execution quality calculation module processor, operatively associated with said message intercept processor, said GUI and said storage, the message intercept processor executing instructions to:

non-intrusively copy transmission data defining a desired open securities order communication associated with an open securities order from the securities investor system to the executing broker system, derive order information from the desired open securities order communication;

selectively copy one or more transmissions comprising data defining open securities order execution communications from the executing broker system to the securities investor system; and derive execution information from each of the copied one or more transmissions of the open securities order execution communications that are associated with the order information derived from the copied open securities order communication; and the execution quality calculation module processor is configured to:

calculate one or more execution qualities based on the execution information;

generate, by the GUI on at least one display device of the securities investor system, a first screen, the first screen comprising a selectable first region configured to display the one or more execution qualities in real-time in a graphical format simultaneously with the order information;

generate, by the GUI, on the first screen, a second region and at least one input area, responsive to a selection of the selectable first region, the second region configured to display execution quality information and the execution information during execution of the open securities order;

receive, via the at least one input area of the GUI, input from the at least one display device comprising a user performance metric;

aggregate, by the execution quality calculation module processor, the received input with other input, received via the GUI, associated with the open securities order to form an aggregated user performance metric; and generate, by the GUI, on at least one second screen, the aggregated user performance metric as part of performance benchmark information associated with the executing broker system.

14. The system of claim 13, wherein said execution quality information comprises an indication of deviation of a value describing at least one of said one or more execution qualities from one or more predetermined limits.

15. The system of claim 13, wherein said one or more execution qualities is displayed in a comparative format comprising color coding.

16. The system of claim 15, wherein the GUI graphically displays, via one or more of the first screen and the at least one second screen, one or more of the following:

a proportion of a market volume executed for said copied open securities order execution communications compared to a volume being traded for a security of said copied open securities order execution communications by other market participants, a comparison of execution qualities for a plurality of securities orders sent to said executing broker system, or sent to more than one executing broker system, an identification of a securities order for a plurality of selected securities orders for the executing broker system, a visual identification of a plurality of execution qualities comprising all or a selected one or more execution qualities which have been previously or currently provided for the plurality of selected securities orders, a list of plurality of execution brokers arrange in an order corresponding to a performance quality, a selection for related information to a particular securities order of said plurality of selected securities orders, an indication of what proportion of said particular securities order has been executed, and a selection for recording by the securities investor system an opinion about implementation of said particular securities order, or about the performance of one or more executing brokers associated with the executing broker system.

17. The system of claim 13, wherein the execution quality calculation module processor is further configured to:

receive, in real-time, the execution information from the message intercept processor;

receive real-time generic market data related to the open securities order; and compare the real-time generic market data with the execution information of each of the open securities order execution communications to calculate, in real-time, the one or more execution qualities, said one or more execution qualities being indicative of an executing broker performance.

18. The system of claim 17, wherein at least one of said one or more execution qualities is assessed by calculating a difference between a volume-weighted average price indicated within said copied open securities order execution communications, and a volume-weighted average price of said real-time generic market data or near real-time market data.

19. The system of claim 13, wherein said performance benchmark information comprises a comparison of a performance of two or more selected executing brokers using said one or more execution qualities for said copied open securities order execution communications such that a best broker out of said two or more selected executing brokers is further identified, said two or more selected executing brokers being associated with one or more executing broker systems.

20. The system of claim 13, wherein information displayed via the GUI regarding said one or more execution qualities is accumulated over a predetermined period of time.

21. The system of claim 13, wherein:
the message intercept processor and the execution quality module processor are configured to non-intrusively copy two-way transmissions to determine a quality associated with the two-way transmissions without interfering with a transmission path or time of the two-way transmissions,
the message intercept processor further executing instructions to:
non-intrusively copy the transmission data by copying a transmission from the electronic communication link between the securities investor system and the executing broker system with the executing broker system as a destination of the transmission,
the copy occurring in real time as the transmission is traveling between the securities investor system and the executing broker system over the electronic communication link without interfering with the transmission path or time from the securities investor system to the executing broker system,
sense the desired open securities order communication within the transmission from the copied transmission,
selectively copy the one or more transmissions from the electronic communication link with the securities investor system as a destination of the one or more transmissions, the copy occurring in real time as the one or more transmissions are traveling between the securities investor system and the executing broker system over the communication link without interfering with the transmission path or time of the one or more transmissions from the executing broker system to the securities investor system,
sense the open securities order execution communications within the one or more transmissions from the copied one or more transmissions,
match the sensed open securities order execution communications with the order information derived from the copied open securities order communication, and
derive the execution information responsive to the matching, and
the execution quality calculation module processor is further configured to:
receive the order information from the message intercept processor derived from the copied transmission of the desired open securities order communication and store the received order information in the storage; and
convey, by the GUI, the one or more execution qualities on the at least one display device over an independent electronic communication link between the execution quality calculation module processor and the securities investor system.

22. A computer software product, comprising a non-transitory computer-readable storage medium having computer readable instructions stored thereon for execution by at least one special-purpose processor to determine and convey a quality associated with data transmissions in real time without interfering with the data transmissions, the computer readable instructions causing the at least one special-purpose processor to perform a method comprising:
non-intrusively copying, at a message interceptor module, transmission data defining a desired open securities order communication associated with an open securities order from a securities investor system to an executing broker system;
deriving, by the message interceptor module, order information from the desired open securities order communication;
selectively copying, at the message interceptor module, one or more transmissions comprising data defining open securities order execution communications from the executing broker system to the securities investor system;
deriving, by the message interceptor module, execution information from each of the copied one or more transmissions of the open securities order execution communications that are associated with the order information derived from the copied open securities order communication;
calculating, by an execution quality calculation module, one or more execution qualities based on the execution information;
generating, by the GUI, on at least one display device of the securities investor system, a first screen, the first screen comprising a selectable first region configured to display the one or more execution qualities in real-time in a graphical format simultaneously with the order information;
generating, by the GUI, on the first screen, a second region and at least one input area, responsive to a selection of the selectable first region, the second region configured to display execution quality information and the execution information during execution of the open securities order;
receiving, via the at least one input area of the GUI, input from the at least one display device comprising a user performance metric;
aggregating, by the execution quality calculation module, the received input with other input, received via the GUI, associated with the open securities order to form an aggregated user performance metric; and
generating, by the GUI, on at least one second screen, the aggregated user performance metric as part of performance benchmark information associated with the executing broker system.

23. The computer software product of claim 22, wherein the computer readable instructions further cause the at least one special-purpose processor to perform the method comprising:
receiving in real-time, by the execution quality calculation module, the execution information from the message interceptor module, and real-time generic market data related to the open securities order; and
comparing, by the execution quality calculation module, the corresponding generic market data with the execution information of each of the open securities order execution communications to calculate, in real-time, the one or more execution qualities,
said one or more execution qualities being indicative of an executing broker performance.

24. The computer software product of claim 22, wherein:
said non-intrusively copying comprises copying of at least one two-way transmission without interfering with a transmission path or time of the two-way transmissions, comprising:
copying, at the message interceptor module, a transmission comprising the transmission data from an electronic communication link between the securities investor system and the executing broker system with the executing broker system as a destination of the transmission, the copying occurring in real time as the transmission is traveling between the securities investor system and the executing broker system over the electronic communication link without interfering with the transmission path or time from the securities investor system to the executing broker system, sensing, by the message interceptor module, the desired open securities order communication within the transmission from the copied transmission, and receiving and storing, at the execution quality calculation module, from the message interceptor module, the order information derived from the copied transmission of the desired open securities order communication, the selectively copying of the one or more transmissions further comprises copying the one or more transmissions from the electronic communication link with the securities investor system as a destination of the one or more transmissions, the copying occurring in real time as the one or more transmissions are traveling between the securities investor system and the executing broker system over the electronic communication link without interfering with the one or more transmissions from the executing broker system to the securities investor system, sensing, by the message interceptor module, the open securities order execution communications within the one or more transmissions from the copied one or more transmissions, matching, by the message interceptor module, the sensed open securities order execution communications with the order information derived from the copied open securities order communication, and deriving, by the message interceptor module, the execution information responsive to the matching, and wherein the one or more execution qualities are conveyed by the GUI on the at least one display device over an independent electronic communication link between the execution quality calculation module and the securities investor system.

* * * * *